(12) United States Patent
Karlsson

(10) Patent No.: US 9,538,879 B2
(45) Date of Patent: Jan. 10, 2017

(54) HEATING-ENERGY SAVING SYSTEM AND METHOD

(75) Inventor: Martin Karlsson, Mariestad (SE)

(73) Assignee: Nestec S.A., Vevey (CH)

( * ) Notice: Subject to any disclaimer, the term of this patent is extended or adjusted under 35 U.S.C. 154(b) by 1100 days.

(21) Appl. No.: 13/273,923

(22) Filed: Oct. 14, 2011

(65) Prior Publication Data

US 2012/0095616 A1 Apr. 19, 2012

(30) Foreign Application Priority Data

Oct. 18, 2010 (EP) .................................... 10187919

(51) Int. Cl.
*A47J 31/52* (2006.01)
*A47J 31/54* (2006.01)
*A47J 31/56* (2006.01)

(52) U.S. Cl.
CPC .............. *A47J 31/52* (2013.01); *A47J 31/545* (2013.01); *A47J 31/56* (2013.01)

(58) Field of Classification Search
CPC .. F25D 29/00; F25D 2700/04; F25D 2700/02; G06F 9/105; G05D 23/1917; G07F 13/065; G07F 9/105; F25B 2219/2654; F25B 2600/23; G05B 2219/2654
USPC .... 700/237, 244, 296, 295, 214; 62/131, 89, 62/132, 157
See application file for complete search history.

(56) References Cited

U.S. PATENT DOCUMENTS

| | | | | |
|---|---|---|---|---|
| 4,354,613 A | * | 10/1982 | Desai et al. | 377/1 |
| 4,682,537 A | * | 7/1987 | Snowball et al. | 99/282 |
| 7,994,722 B2 | * | 8/2011 | Garson et al. | 315/76 |
| 2004/0050075 A1 | * | 3/2004 | King et al. | 62/131 |
| 2006/0289553 A1 | * | 12/2006 | Ehlers et al. | 221/9 |
| 2008/0077275 A1 | * | 3/2008 | Merwarth et al. | 700/240 |
| 2008/0274246 A1 | | 11/2008 | Glucksman et al. | |
| 2009/0094081 A1 | * | 4/2009 | Wittern et al. | 705/7 |
| 2009/0159612 A1 | * | 6/2009 | Beavis et al. | 222/52 |
| 2010/0232088 A1 | * | 9/2010 | Fujita et al. | 361/517 |

FOREIGN PATENT DOCUMENTS

| | | |
|---|---|---|
| CN | 201055295 | 5/2008 |
| EP | 2027799 | 2/2009 |
| EP | 2149828 | 2/2010 |

(Continued)

OTHER PUBLICATIONS

Japanese Office Action for Application No. P2011-220282, Dispatch No. 386434, dated Aug. 25, 2015, 11 pages.

*Primary Examiner* — Christopher E Everett

(74) *Attorney, Agent, or Firm* — K&L Gates LLP

(57) ABSTRACT

A heating-energy saving system and a heating-energy saving method, which realize self-learning energy preservation (SLEP) system or method. By means of this system or method, the energy consumption of a beverage machine, which is mainly due to heating of the liquid required to provide hot beverages, can be reduced. At the same time, by adaptively learning and anticipating when a user is likely to use the beverage machine, the waiting time for the user, which is typically caused by the reheating process of the liquid in the beverage machine, can be significantly reduced. The system adapts the heating to what it learns from the user behavior. The described system and method are adapted to be installed in all kinds of beverage machines, either used in private or in public.

10 Claims, 6 Drawing Sheets

(56) References Cited

FOREIGN PATENT DOCUMENTS

| | | |
|---|---|---|
| JP | 2000139775 | 5/2000 |
| JP | 2000194911 | 7/2000 |
| JP | 2002142988 | 5/2002 |
| JP | 2002150371 | 5/2002 |
| JP | 2005336753 | 12/2005 |
| JP | 2006036132 | 2/2006 |
| JP | 2006131549 | 5/2006 |
| JP | 2007057141 | 3/2007 |
| JP | 2007249529 | 9/2007 |
| JP | 2010191597 | 9/2010 |

* cited by examiner

HEATING-ENERGY SAVING SYSTEM AND METHOD

CROSS REFERENCE TO RELATED APPLICATIONS

The present application claims priority to European Priority Patent Application 10187919.5 filed Oct. 18, 2010, the entire content of which is hereby incorporated by reference.

BACKGROUND

The present invention relates to a heating-energy saving system and a heating-energy saving method for use with a heating-system of a beverage machine, which is adapted to produce hot beverages. In particular, the present invention relates to the so-called self learning energy preservation (SLEP) system and method, which have been developed for saving heating-energy in commonly used beverage machines. The SLEP system and method help to reduce the energy consumption of the beverage machine, while at the same time help to minimize the waiting time for users of the beverage machine, when the liquid in the beverage machine has to be reheated.

Devices for preparing hot beverages are well-known in the art, especially in the field of producing tea, coffee, or coffee type beverages. Additionally, other substances such as chocolate or milk products can be extracted or dissolved to form a hot beverage in such beverage machines. For the preparation of such hot beverages in an appropriate beverage machine a suitable liquid (e.g. water or milk or the like) is heated by a heating-system, which is provided in a supply means and is supplied to a beverage production chamber of the beverage machine. In view of the energy consumption of the beverage machine, the heating process consumes by far the biggest amount. Therefore, reducing the energy consumption of the beverage machine by controlling the heating-system is very efficient.

Beverage machines known from prior art, usually achieve a reduction of the energy consumption by directly controlling the heating of the liquid with a timer. The timer is adapted to stop the heating of the liquid, after the beverage machine has not been used for a predetermined amount of time. Completely stopping the heater is the most efficient way to reduce the energy consumption.

However, if the heater has been off for a certain amount of time, the liquid in the supply means of the beverage machine is cooled down, and has to be reheated before the beverage machine can be operated the next time to produce a hot beverage. Reheating the liquid requires a certain waiting time, and it is very frustrating for the user to wait while the beverage machine is reheating the liquid. Only after the reheating process is completed, the user can again operate the beverage machine to obtain the hot beverage.

SUMMARY

In view of the above-described disadvantages of the simple timer, it is desirable to provide more sophisticated system and a method that efficiently reduce the energy consumption of a beverage machine, but at the same time minimize the waiting time for a user, which occurs when the liquid in the beverage machine is reheated. Further, a system and method are desired, which can be implemented with any kind of beverage machines that comprise a heating-system.

In a first aspect the present invention discloses a heating-energy saving system for use with a heating-system of a beverage machine. The system comprises a timer, a plurality of data registers, wherein each data register is active within a predetermined range of time, and wherein each data register can hold one of at least two values, a detection unit for detecting a usage of the beverage machine, a control unit adapted to determine the values of the plurality of data registers and to change the value of the active data register upon a detection by the detection unit. The control unit is further adapted to turn off the heating-system of the beverage machine, if it determines that the active data register holds a value equal to or lower than threshold value, and to turn on the heating-system of the beverage machine, if it determines that the active data register holds a value larger than the threshold value.

The above-described heating-energy saving system is a so-called self-learning energy preservation (SLEP) system. The system learns user behavior and adapts to it, by only heating the beverage machine when a user is anticipated. Upon detection of the usage of the beverage machine, the control unit changes the value of the active register in such a way that it reflects the usage of the beverage machine. After a certain learning period, when the plurality of data registers have been active a couple of times, the values in the individual data registers reflect and anticipate the usage of the beverage machine within each predetermined range of time very well. By determining these values and comparing them to a threshold value, wherein the result of the comparison automatically triggers either the turning on or turning off of the heating-system, the energy consumption can be significantly reduced. However, also the waiting time for the user can be minimized, because the heating-system of the beverage machine is only turned off, if no usage is anticipated, and is turned back on in anticipation of a usage.

Preferably, each of the plurality of data registers is adapted to hold at least one integer value from 0 to 3, the control unit is adapted to increase the value of the active data register by one increment if a usage of the beverage machine is detected by the detection unit, and the control unit is adapted to decrease the value of the active data register by one increment, if no usage of the beverage machine is detected for the by the detection unit for the predetermined range of time.

Four values from 0 to 3 in integer steps provide a good resolution for the heating-energy saving system to anticipate a usage of the beverage machine. However, also fewer or more than four values could be used. By increasing the value in the active data register by integer increments, if a usage of the beverage machine is detected, the heating-energy saving system reflects the increased probability of usage in the current predetermined range of time. By decreasing the value in the active data register, if no usage of the beverage machine has been detected, the heating-energy saving system reflects the fact of a low probability of usage in the predetermined range. By increasing and decreasing only by single increments, when using values from 0 to 3, it can be avoided that, for example, a predetermined range of time, in which the beverage machine is usually used heavily, is incorrectly reflected for anticipation, if only once no usage occurs. Assuming for example that the above-mentioned threshold value is 0, and that a data register associated with a predetermined range of time currently holds a value of 3, it requires three steps of decreasing, i.e. three consecutive times the beverage machine is not used in this predetermined range of time, to reach the threshold value, at which the heating-system will be turned off.

Preferably the threshold value is 0, as described above.

Preferably, the value of each data register is limited to be increased by one increment during the predetermined range of time. Thus, an overrating of single unusual occasions, in which heavy use of the beverage machine occurs, is avoided.

Preferably, the control unit is adapted to turn on the heating-system of the beverage machine, if the value of the active data register is determined to be a value different from 0.

Thereby, the waiting time for the users can be minimized most efficiently. If alternatively a value of 3 would be the threshold, i.e. would have to be reached, until the heating-system is turned on in anticipation of a user, the energy consumption would be reduced the most. The system realizes different compromises between the reduction of the energy consumption and the waiting time, depending on the threshold value.

Preferably, the detection unit is a flow measurement unit for detecting the output of a beverage. Thereby, a clear indication for the use of the beverage machine is obtained.

Preferably, the detection unit is a motion detector, and the control unit is adapted to turn on the heating-system of the beverage machine, if it detects motion for a predetermined period of time.

Thus, it is not necessary that the user really operates the machine, but it is sufficient that the user lingers in the vicinity of the beverage machine for a predetermined period of time to start a reheating process. Many users start to prepare their cup or additional ingredients like sugar for the hot beverage, before they actually operate the beverage machine. In a case that the beverage machine had been turned off, and the motion detector detects the user, the beverage machine heating-system can already start to reheat. Thus, the required waiting time for the user can be reduced.

Preferably, the detection unit is adapted to detect the input of coins or the insertion of a credit card into the beverage machine, in order to determine a usage of the beverage machine. Especially for commercial beverage machines it is desired that a use of the beverage machine is actually correlated with payment.

Of course also more than one detection unit can be used. Any combination of the above-described detection units, or further detection units known by the skilled person, is conceivable.

Preferably the heating-energy saving system further comprises a memory for storing the detection results of the detection unit, wherein the control unit is adapted to generate, update and store in the memory patterns regarding the usage of the beverage machine based on the detection result stored in the memory, and to change the threshold value and/or the predetermined range of time, in which a data register is active based on the usage patterns.

This additional system for anticipating user activity measures the long-term usage. If the values in the predetermined registers, due to a single occurrence, do not reflect a completely correct picture of the usage of the beverage machine, taking additionally into account patterns, which are stored in the memory, the system performance can be improved. Especially changing the threshold value based on the long-term anticipation of the usage of the beverage machine, allows a balancing of the focus of the system between a reduced waiting time and an energy reduction. Shorter predetermined ranges of time could improve the resolution, which might be required in some cases. Longer predetermined ranges of time can further reduce the energy consumption.

Preferably the heating-energy saving system further comprises a touch panel for receiving a user input, wherein the control unit is adapted to change the threshold value and/or the predetermined range of time, in which a data register is active, based on the user input. The user thus gains control over all relevant parameters of the SLEP system.

Preferably the control unit is adapted to postpone turning off the heating-system of the beverage machine, even if it determines that the active data register holds a value equal to a lower than the threshold value, if a usage pattern stored in the memory indicates a current usage probability higher than a predetermined threshold probability.

By means of postponing the time point, at which the heating-system is turned off, the performance of the heating-energy saving system can be improved.

Preferably, the heating-energy saving system is adapted to postpone turning off the heating system of the beverage machine, even if it determines that the active data register holds a value equal to or lower than the threshold value, if a temporal distance between the last detected usage of the beverage machine and a beginning of a predetermined range of time, in which a next data register becomes active, is below a predetermined threshold time.

This prevents cases, in which the heating-system is turned off just because a new predetermined range of time is reached, for which the value of the corresponding data register is beneath the threshold, although users are still in the process of preparing beverages. That means, even when the new predetermined range of time is reached, but shortly before a user had prepared a beverage, turning off of the heating-system is postponed, since the probability is high that another hot beverage will be desired by another user. This is due to the fact that users tend to consume hot beverages in company, i.e. groups.

Preferably, the heating-energy saving system comprises 24 data registers, wherein the predetermined range of time, in which each data register is active, is one hour measured by the timer. Thus, an hour wise resolution over the 24 hours of a day can be achieved, which is most intuitive for users.

In a second aspect the invention discloses a heating-energy saving method for use with a heating-system of a beverage machine comprising the steps: of monitoring the time, associating each of a plurality of data registers with a predetermined range of time, wherein an active data register is associated with a current predetermined range of time, and wherein each data register can hold one of at least two values, detecting a usage of the beverage machine, determining the value of the active data register and changing the value of the active data register upon a detection in the detecting step, turning off the heating-system of the beverage machine, if it is determined that the active data register holds a value equal to or lower than a threshold value, and turning on the heating-system of the beverage machine, if it is determined that the active data register holds a value larger than the threshold value.

The heating-energy saving method achieves the same advantages as described above for the heating-energy saving system. For all the described extensions (additional features) of the heating-energy saving system, the corresponding method steps are covered by the present invention. For example, such method steps include steps of: increasing and decreasing values of active data registers, limiting the increase by one increment during the predetermined range of time, measuring the flow of the beverage machine, detecting motion, detecting the insertion of coins or credit cards, storing detection results, generating, updating and storing usage patterns, receiving user input, and/or postponing the turning off or turning on of the heating-system.

The above described self-learning energy preservation system or method (corresponding to the heating-energy saving system and method, respectively) reduces the energy consumption of the beverage machine, while at the same time minimizing the waiting time for a user, i.e. the waiting time caused by reheating the liquid in the beverage machine.

Additional features and advantages are described herein, and will be apparent from the following Detailed Description and the figures.

BRIEF DESCRIPTION OF THE FIGURES

The present invention will be described in more detail below, in reference to the attached drawings.

DETAILED DESCRIPTION

Figure 1:
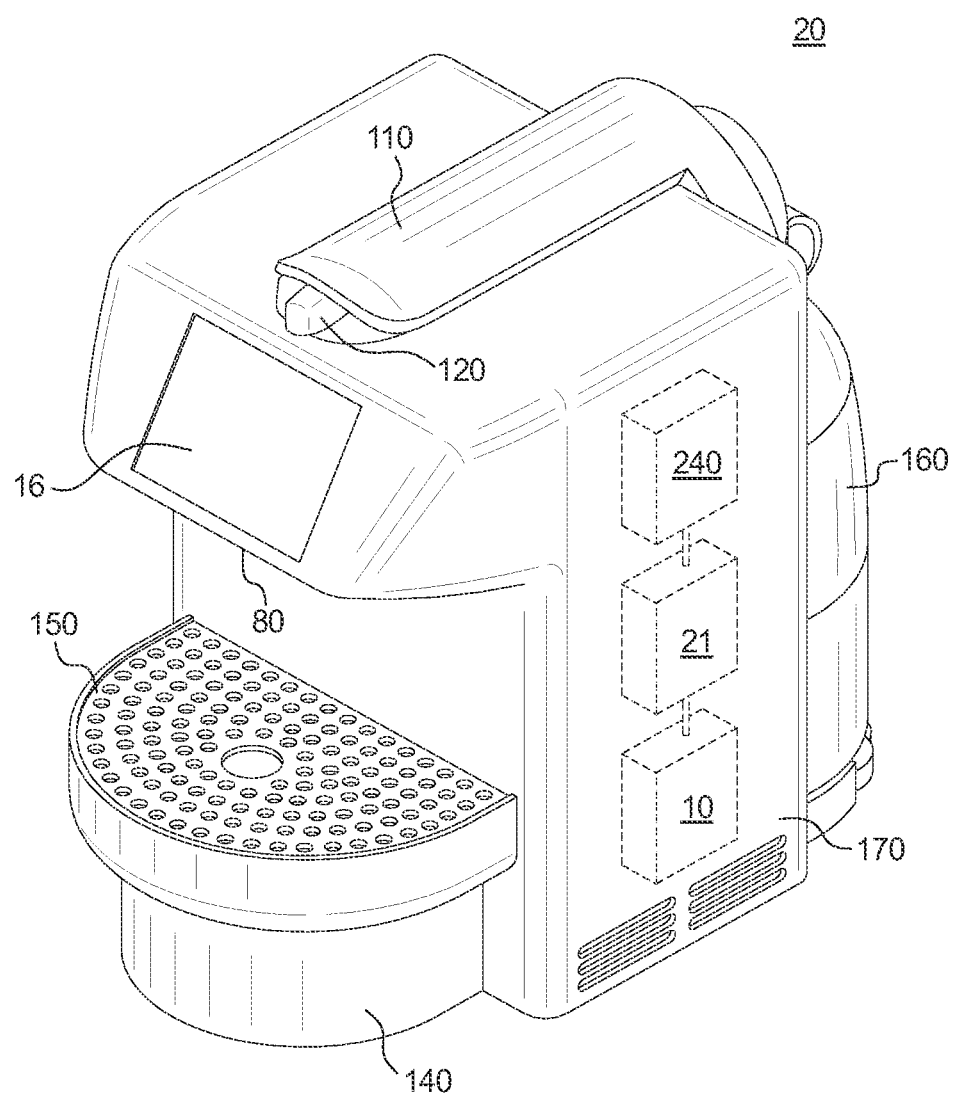
FIG. 1 shows an exemplary beverage device, in which the heating-energy saving system according to the present invention can be used.

FIG. 1 shows an example of a beverage machine 20, in which the heating-energy saving system 10 according to the present invention can be implemented. However, the heating-energy saving system 10 can be implemented basically into every beverage machine 20 that is equipped with a heating-system 21, and the following description is only an illustrative example of a beverage machine 20. However, all beverage machines 20 are more or less composed of similar components, and thus the following description can be helpful.

The beverage machine 20 of FIG. 1 comprises a casing 170, which houses further components, or to which further components are attached. A hot beverage can be produced by the beverage machine 20, and can be delivered to a beverage delivery outlet 80 by a pump 240, which is located inside the beverage machine 20. On the rear side of the casing 170 a liquid supply reservoir or a liquid container 160 can be provided. The liquid can be any liquid, like water or milk, suitable to prepare hot beverages, or soup or the like, suitable to prepare hot liquid meals.

On the front side of the beverage machine 20 a base part can be provided. The base part can essentially have a shape of a half cylindrical platform. The base part can comprise a drip tray 140, and the upper surface of the base part can serve as a cup support 150 in the region, which is essentially arranged vertically below the beverage delivery outlet 80. The beverage machine 20 can further comprise a catchment tank 130. The drip tray 140 can serve for collecting liquid dripping from the beverage delivery outlet 80. The base part comprising the drip tray 140 and the cup support 150 can be removably attached to the casing 170. Alternatively, the entire component consisting of the drip tray 140, the cup support 150 and the catchment tank 130 can be attached removably to the casing 170, in order to rinse or empty the drip tray 140 and to empty the catchment tank 130.

Inside the casing 170 the beverage machine 20 can comprise a liquid pump 240, a heating-system 21, such as for example a thermo block or a boiler, as well as an extraction chamber. To the heating-system 21, the heating-energy saving means 10 according to the present invention can be connected, so as to control the heating-system 21, as will be explained later. The beverage machine 20 may also comprise a controller (not shown) and a user interface board (like a touch panel 16 explained later) to manage the beverage preparation cycles as known in the art. Thus the beverage machine 20 is capable of producing heated, preferably pressurized liquid, and then to feed it into a preparation chamber, in order to prepare hot beverages, meals or the like in a cup or glass.

The pump 240 and the heating-system 21, as well as further components housed in the casing 170, are not visible from the outside, and are therefore showed with dashed lines in FIG. 1.

The extraction chamber or preparation chamber can be designed to house a beverage ingredient containing pouch or capsule, which can be inserted through a insertion slot 120 on the top surface of the casing 170 when lifting or opening a lever or lid arranged at the top surface of the casing 170. The lever or lid can function also as activator 110 for mechanically or automatically clamping, for example, the capsule and starting the preparation process. Heated liquid, preferably under pressure, will then be injected into, for example the capsule, in order to interact with the ingredients contained therein. The ingredients are such as leaf tea, ground coffee, and the like. The catchment tank 130 is used for collecting, for example, capsules, which have been used, and which dropped internally after the beverage has been delivered.

Notwithstanding the above description, the capsule is not limited to any size or design, and there can also be used any other known beverage ingredient storage means or beverage preparation chambers also comprising a filter element for preparation of a beverage by extraction of beverage ingredients with heated liquids, preferably heated low-pressure liquids. In the following, liquid stands for all kinds of liquids for being used in a beverage production machine as, for instance, water, milk or soup. However, in case a capsule is used as beverage ingredient storage means, the beverage machine 20 may further comprise a means for perforating the capsule, and the perforating means can be activated by the activator 110.

The beverage machine 20 can also work with bulk powders or liquids instead of capsules. The beverage preparation chamber can also be designed to receive a dose of food concentrated ingredient from at least one food ingredient tank present in the machine. This food concentrated ingredient can be either a powder or a liquid of an ingredient like coffee, milk, tea, chocolate, soup. The beverage preparation chamber is also designed to receive a heated liquid, in order to dissolve the at least one food concentrated ingredient and eventually froth the resulting mixture.

Figure 2:
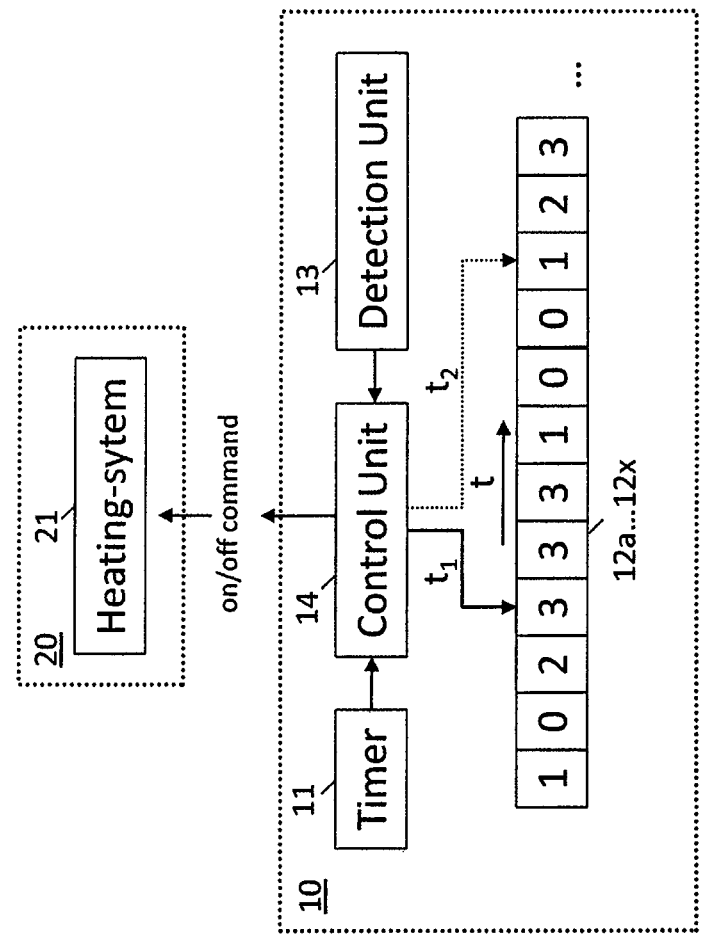
FIG. 2 shows a schematic diagram of the heating-energy saving system according to a first embodiment of the present invention.

FIG. 2 shows the heating-energy saving system 10 according to the present invention, which is used with a heating-system 21 of a beverage machine 20, as shown in the above-described example. The heating-energy saving system 10 is adapted to anticipate the usage of the beverage machine 20, and thus can help to save energy by a controlled switching on and switching off of said heating-system 21. At the same it can help to minimize the waiting time for users, during which the heating-system 21 reheats the liquid, which is required to prepare hot beverages.

To this end, the heating-energy saving system 10 uses a plurality of data registers 12a to 12x, wherein each data register 12a to 12x is adapted to take at least one of two values. A data registers 12a to 12x is a small amount of storage, which is available to a control unit 14. The storage can be realized by any conventional nonvolatile storing technology, like ROM, Flash or the like. The heating-energy saving system 10 further comprises a timer 11, which is adapted to measure the time and to establish predetermined ranges of time. The predetermined ranges of time are for example created by dividing a predetermined time span, like a full day, into equal parts. Further, the predetermined ranges of time counted by the timer 11 are repeated, after the last predetermined range of time is reached, i.e. when the predetermined time span has elapsed. Thus, the timer can continuously associate the current time with one of the predetermined ranges of time. The timer is for example a clock, but can also be any other suitable device for keeping track of the time.

Each of the plurality of data registers 12a to 12x is associated with one of the predetermined ranges of time. In other words, the plurality of data registers 12a to 12x are indexed, and the index is determined by the timer 11 depending on the currently valid predetermined range of time. The data register 12a to 12x, which is associated with the current predetermined range of time, is defined as the active data register 12a to 12x. If a data register 12a to 12x is active, it can be accessed, the value it holds can be read out, and new values can be written into it by replacing the current value. With the passing of time, different data registers 12a to 12x become the active data register 12a to 12x, and values held in the data registers 12a to 12x are read out and used to anticipate the usage of the beverage machine 20. The more often each data register 12a to 12x has been active, the more accurate the heating-energy saving system 10 becomes.

As shown in FIG. 2 the heating-energy saving system 10 further comprises the above-mentioned control unit 14 and a detection unit 13. The control unit 14 receives the current time i.e. current predetermined range of time, from the timer 11. Based thereon, the control unit 14 can access and address the plurality of data registers 12a to 12x, wherein for each point in time one data register 12a to 12x is active. For example, for the time point t1 shown in FIG. 2 the fourth data register 12a to 12x is active, and for the time point t2 the tenth data register 12a to 12x is active. The order of the data registers 12a to 12x is determined by the time arrow, which is indicated from the left to the right side of FIG. 2, and is denominated with t. Each data register 12a to 12x corresponds to one predetermined range of time, which contains at least one or preferably multiple time points.

The control unit 14 accesses the currently active one of the plurality of data registers 12a to 12x, and is able to determine the value held by the active data register 12a to 12x, i.e. it can read out the value from the active data register 12a to 12x via a connection. Further, the control unit 14 is also adapted to change the value of the currently active data register 12a to 12x, wherein such a change comprises, for example, increasing the value, decreasing the value, or setting a new value. Each data register 12a to 12x is at least adapted to hold one of at least two values, but preferably to hold one of four integer values from 0 to 3. Naturally, however, also more values can be used for each data register 12a to 12x.

As indicated by the on/off command in FIG. 2, the control unit 14 controls turning on and turning off the heater of the heating-system 21 of the beverage machine 20. Naturally, the energy consumption can be reduced, if the heating-system 21 is turned off. However, if the heating-system 21 is turned off, reheating requires a certain amount of time, which is annoying for a user. Therefore, the control unit 14 controls the heating-system 21 of the beverage machine 20 depending on the values stored in the plurality of data registers 12a to 12x. In particular, the control unit 14 determines for the current predetermined range of time the active data register 12a to 12x. The control unit 14 then determines the value stored in the active data register 12a to 12x, i.e. it reads out the value from the active data register, and analyses the obtained value. In particular, it compares the obtained value with a threshold value. Then, if the value is equal to or lower than the threshold value, the control unit 14 turns off the heating-system 21 of the beverage machine 20. Naturally, the control unit 14 only turns off the heating-system 21 of the beverage machine 20, if it is currently turned on. If it is currently turned off, no action is performed. On the other hand side, when the value obtained from the active data register 12a to 12x is larger than the threshold value, the control unit 14 sends a command, in order to turn on the heating-system 21 of the beverage machine 20. Again, this is only relevant if the heating-system 21 is currently turned off, otherwise no action is performed. Since the values held by the plurality of data registers 12a to 12x reflect, as described in the following, the usage of the beverage machine 20, the control unit 14 can efficiently control the heating-system 21, in order to reduce the energy consumption and to minimize waiting time for users.

The heating-energy saving system 10 further comprises a detection unit 13, which is used to change the values in the plurality of data registers 12a to 12x, so that they properly reflect the usage of the beverage machine 20. The detection unit 13 is able to detect the usage of the beverage machine 20, and to transmit this information to the control unit 14. When detection is indicated to the control unit 14, the control unit 14 is able to change the value of the active data register 12a to 12x, i.e. it can increase or decrease the value, or can write a new value into the data register 12a to 12x. Thus, each usage of the beverage machine 20 influences the values in the plurality of data registers 12a to 12x, and an anticipation of the future usage can be achieved. The control unit 14 is, for example, adapted to increase the value of the active data register 12a to 12x, if usage of a beverage machine is detected by the detection unit 13. On the other hand side, the control unit 14 is for example adapted to decrease the value of the active data register 12a to 12x, if no usage of the beverage machine 20 is detected for a predetermined range of time.

Preferably, the data registers each hold one of four values of 0 to 3. Preferably, the increase and decrease of the value of the active data register 12a to 12x is performed by one integer increment. If the maximum or minimum value is reached (e.g. 0 or 3, respectively), no further increase or decrease is carried out. Other value ranges for each of the plurality of data registers 12a to 12x, and other schemes of changing the values in the active data register 12a to 12x upon detection (or no detection) by the detection unit 13 are conceivable. If the value in the active data register 12a to 12x is increased, a higher likelihood of a usage of the beverage machine 20 in the predetermined range of time, which is associated with the active data register 12a to 12x, is reflected. On the other hand side, if the value is decreased, i.e. no usage of the beverage machine 20 has been detected for the predetermined range of time, a lower likelihood in this predetermined time range is reflected. The system is thus able to learn over time the user behavior, and to accurately anticipate, whether a predetermined range of time has a high or a low likelihood that the beverage machine 20 is used. This likelihood is reflected by one of the values 0 to 3.

In a preferred embodiment of the invention, the threshold value is 0. The control unit 14 will turn off the heating-system 21 of the beverage machine 20, if it reads a value of 0 from the active data register 12a to 12x. If it reads a value higher than 0, i.e. 1, 2 or 3, the control unit 14 turns on the heating-system 21 of the beverage machine 20. If a data register 12a to 12x currently holds a value of 3, and if no usage of the beverage machine 20 is detected by the detection unit 13 in the predetermined range of time, which is associated with said data register 12a to 12x, said value is decreased to 2, and thus the heating-system 21 of the beverage machine 20 will still be turned on the next time the predetermined range of time, which is associated with said data register 12a to 12x, occurs. Therefore, excursions in terms of the usage of the beverage machine 20 are compensated for. Only if in a particular predetermined range of time no usage of the beverage machine 20 is detected by the detection unit 13 for three consecutive times, the value of the data register 12a to 12x associated with this predetermined range of time, will decrease from 3 to the threshold value of 0. An excursion can be excluded in such a case, and the fact that in this predetermined range of time no use of the beverage machine 20 is likely, is accurately reflected. To this end, each data register 12a to 12x is also limited to be increased only by one increment during its associated predetermined range of time. Otherwise, a heavy use of the beverage machine 20 in a particular predetermined range of time, which could be for example be due to some special event, would falsify the learning process of the heating-energy saving system 10.

Figure 3:
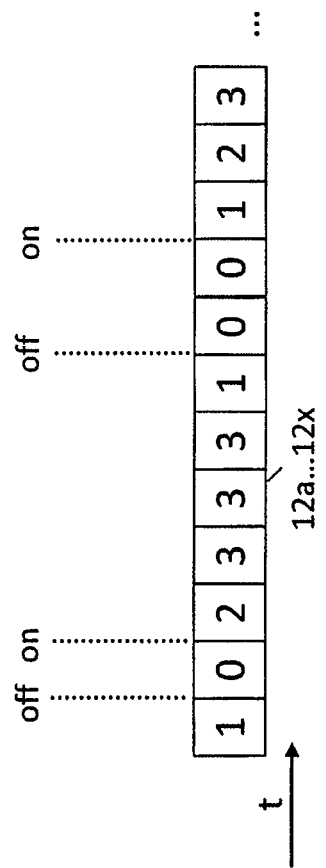
FIG. 3 shows a schematic diagram of the plurality of data registers of the heating-energy saving system according to the first embodiment of the present invention.

FIG. 3 shows exemplarily how the values held by the plurality of data registers 12a to 12x determine the control of the heating-system 21 by the control unit 14. For illustration, the exemplary threshold of 0 is chosen. The control unit 14 is adapted to turn on the heating-system 21 of the beverage machine 20, if the value of the active data register 12a to 12x is determined to be a value different from 0. This is reflected by the dotted lines labeled with the respective commands in FIG. 3. The passing of time, i.e. the order of the plurality of data registers 12a to 12x, is indicated by the arrow from left to right, labeled with t. Each of the plurality of data registers 12a to 12x corresponds to a predetermined range of time, wherein all predetermined ranges of time together add up to a total operation time (run time) of the beverage machine 20, at maximum 24 hours. It can be seen that the heating-system 21 is turned off starting with the second predetermined range of time, because the value held in the second data register 12a to 12x is 0. With the third predetermined range of time associated with the third of the plurality of data registers 12a to 12x the heating-system 21 receives an on-command. No further command is then given for the next couple of predetermined ranges of time, since all values held in the respective data registers 12a to 12x indicate that the heating system 21 is to be turned on, however it is already turned on. Only with the eighth predetermined range of time, which is associated with the eighth data register 12a to 12x, the heating-system 21 is turned off again, and stays turned off for two further predetermined ranges of time, before finally the tenth data register, having a value of 1, triggers turning back on the heating-system 21. It is intuitively conceivable, when viewing the plurality of data registers 12a to 12x of FIG. 3, that the three neighboring data registers, which all hold a value of 3, represent the time (for example the time of day), where the beverage machine 20 is used most frequently.

The detection unit 13, which detects the usage of the beverage machine 20, can be any suitable detection unit. For example it can be a flow measurement unit, which detects liquid flowing out of the beverage machine 20, and can thus unambiguously conclude that the beverage machine was activated. With such a flow measurement unit, only the actual output of liquid is considered to be a real use of the beverage machine 20, wherein other operations on the beverage machine 20 like cleaning, decalcifying, or refilling the necessary ingredients, like coffee, capsules, liquids, water or milk or the like, are not detected as a real use. Alternatively, a motion detector can be used as detection unit 13, and the control unit 14 can for example turn on the heating-system 21 of the beverage machine 20, if the motion detector detects a motion for a predetermined period of time. Although the motion detector will not detect an actual use, it can be helpful to already turn on the heating-system 21, as soon as a user enters the room, starts preparing his cup, or searches for sugar, near the beverage machine 20. Alternatively, for a beverage machine 20, which is operated commercially, the input of coins or the insertion of a credit card can be used as detection criteria for the usage of the beverage machine 20. This guarantees that only if payment actually occurred, the usage of the beverage machine 20 is registered, and no usage is detected, if users simply press buttons without actually buying a beverage. Of course any other sensors or monitoring devices, like cameras, photo sensors, electric eyes or the like can be used as detection unit 13, in order to determine whether the beverage machine 20 is used or not. For example the insertion of capsules or coffee into the beverage machine 20 can be used as criteria. A plurality of different detection units 13 can be used in combination, wherein a use of the beverage machine 20 is detected, if a detection is indicated by one detection unit 13, or alternatively by a combination of two or more detection units 13.

Figure 4:
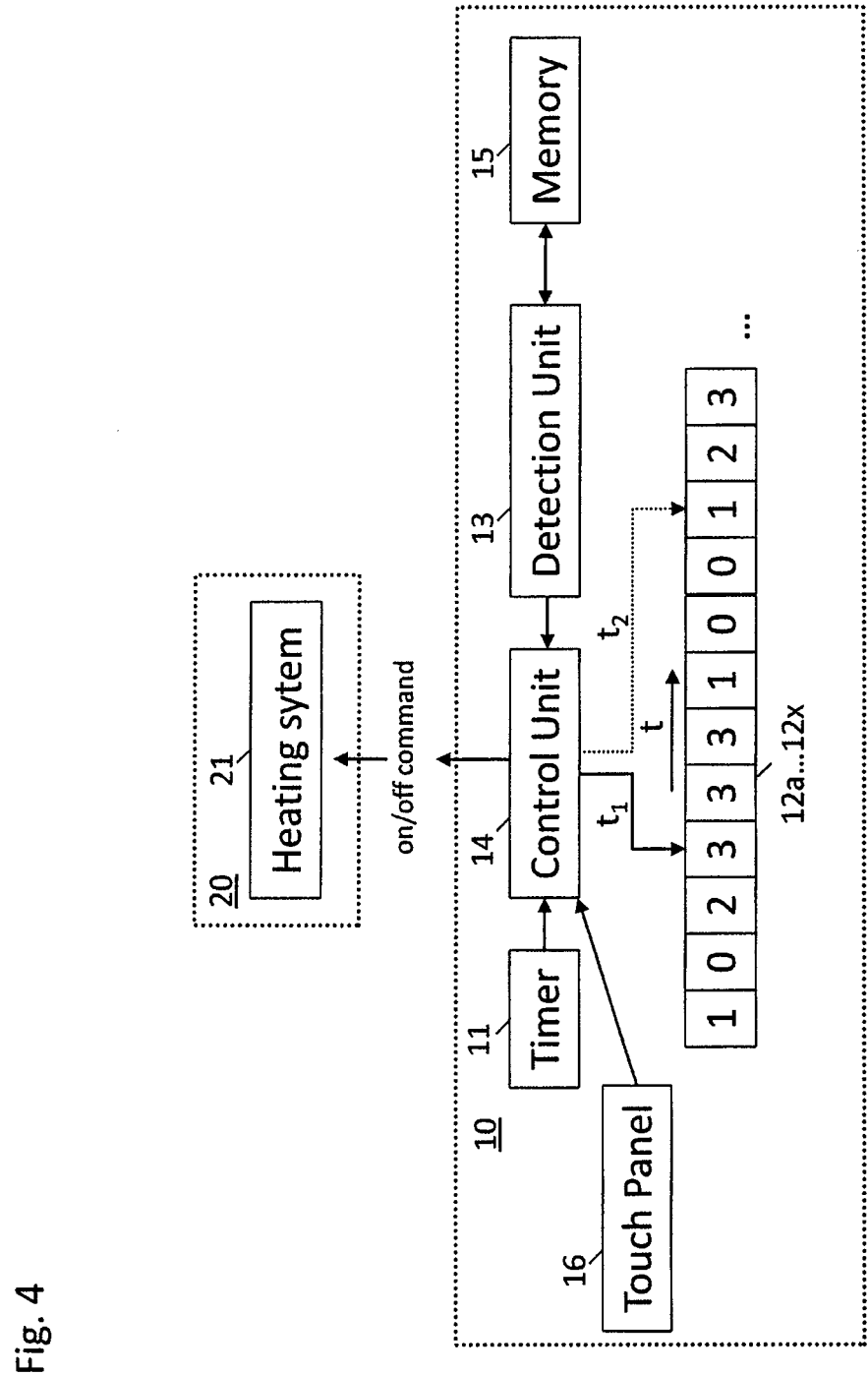
FIG. 4 shows a second embodiment of the heating-energy saving system according to the present invention.

FIG. 4 shows a second embodiment of a heating-energy saving system for use with a beverage machine 20. The second embodiment is similar to the first embodiment shown in FIG. 2, and units, which are used equally in both embodiments, are not explained in the following. The second embodiment in FIG. 4 distinguishes from the embodiment in FIG. 2 by additionally comprising a memory 15 and/or a touch panel 16.

The memory 15 is used for storing the detection results of the detection unit 13, and is thus coupled to the detection unit 13. Data transmissions between the memory 15 and the detection unit 13 function in both ways. The memory 15 can be a semiconductor memory, particularly a flash memory, a hard drive, a disc, or can be an exchangeable memory, in particular a memory chip on a credit card or special user-related card, which can be inserted into the beverage machine 20.

The control unit 14 can access the memory 15 via the detection unit 13. The control unit 14 can read, store, update and write into the memory 15. In particular, patterns regarding the usage of the beverage machine 20 based on the stored detection results can be generated, which themselves can be stored in the memory 15. These patterns can reflect a long-term usage of the beverage machine 20, and can function as an additional means to improve the quality of anticipation by the heating-energy saving system, in addition to the plurality of data registers 12a to 12x. The control unit 14 can further take into account the patterns of usage of the beverage machine 20 stored in the memory 15 when sending commands to turn on or off the heating-system 21. For example, the patterns could be used to change the threshold value, for example from 0 to 1, or to change the predetermined range of time, making it longer or shorter. The patterns can be patterns indicative of the total amount of values stored in the data registers 12a to 12x, the switching frequency of the heating-system 21, the differences between the values stored in the individual data register 12a to 12x, the amount of equal values of data register 12a to 12x in a row, average values calculated over a long term (e.g. finer than integer values), excursions, irregularities, or the like. Any kind of pattern, which is useful to increase the performance of the system 10, can be used.

Concerning the threshold value, in the following the above-mentioned example of four values from 0 to 3, which each data register 12a to 12x can hold, is assumed. If the threshold is 0, the values 1, 2 and 3 indicate that the heating-system 21 of the beverage machine 20 is to be turned on. Only the threshold value of 0 indicates that the heating-system 21 is to be turned off. Thus, the heating-energy saving system 10 focuses more on a reduction of the waiting time, than on a reduction of the energy consumption. Would, however, the threshold value be changed to 3, the heating-system 21 would be turned off most of the time, and would only be turned on in case a user prepares a beverage, or only in very frequently used predetermined ranges of time.

By changing the threshold value based on one or more of said patterns stored in the memory 15, the balance point between reducing the energy consumption and minimizing the waiting time can be varied. For example a case could be imagined that the beverage machine 20 is not used very frequently, but just often enough, so that the heating-system is almost never turned off, i.e. the threshold value is not set in an optimal way. The control unit 14 could identify a pattern indicative of such a case, and could consequently increase the threshold value, which would mean that the heating system 21 will in the future be turned off more often. Different predetermined reference patterns could be stored in the memory 15, which e.g. resemble the plurality of data registers 12a to 12x in a correlated manner, which can serve as comparison to new detected patterns. These predetermined patterns can be read, compared and updated and could be associated with different predetermined actions, which could also be stored in the memory 15, and could be carried out.

The predetermined range of time could e.g. be shortened or could be made longer, depending on whether a higher resolution or a lower resolution (in time) is required. The shorter the predetermined range of time, the more often a switching between turning on and turning off of the heating system 21 will occur. The memory can also store information on individual users, for example in a case where credit cards or special cards with chips have to be used with the beverage machine 20, in order to buy hot beverages. In this case, different patterns for different users can be established and stored. Moreover different threshold values could be used for different predetermined ranges of time, i.e. the threshold value is not constant but continuously adapted. It is also possible to have predetermined ranges of time, which vary in their length, i.e. not every predetermined range of time is the same. Based on light detectors for example, different predetermined ranges of time could be set, because at night a lower resolution of the system 10 might be required, than at day.

Further, a touch panel 16 could be included in the heating-energy saving system 10, which could receive direct user input. As illustrated in FIG. 4, the touch panel 16 is directly connected to the control unit 14, which can receive the user input and process the user input adequately. This can be beneficial, since beverage machines 20 are sold e.g. to individual users, and each user may require or desire a different balancing of the energy reduction and the minimization of the waiting time. Therefore, it is conceivable that via the touch panel 16 the threshold value and/or the predetermined range of time length could be directly changed by the user. The touch panel can be a touch screen, or can be composed of buttons, switches or wheels, which can be installed on the outside of the beverage machine 20, and are operated mechanically, electrically or capacitively. It is further conceivable that a remote control is used to control the heating-energy saving system 10 for use with the beverage machine 20.

Additionally, indicators, like lights (e.g. produced by LEDs) or sounds, can be provided to the user, for example, in order to verify user input. Differently colored or differently bright lights (LEDs) could be provided with the heating-energy saving system 10, can be installed on the beverage machine 20, and can for example indicate whether the heating system 21 is turned on or off, whether the threshold value is high or low (i.e. which value the threshold currently has or how much it deviates from a default threshold value), or how the predetermined ranges of time are currently set (e.g. short or long compared to a standard setting).

The above mentioned indicators could also indicate to the user, how the learning process of the heating-energy saving system has progressed. Therefore, the control unit 14 could estimate based on the plurality of data registers and the usage patterns stored in the memory 15, whether the quality of anticipation is assumed to be high or low. The user thus knows at a glance whether the heating-energy saving system 10 is working efficiently to his liking at the moment. The control unit can determine, whether the heating-energy saving system 10 is working properly within its settings, for example, it could determine how often a waiting time due to reheating occurs. Another exemplary case, where the value of a data register fluctuates regularly between, for example, a value of 1 and 2, indicates that in the respective predetermined range of time, only every second time a hot beverage is prepared. If the threshold is 0, the heating-system 21 would regardless never be turned off. Thus, it would seem more appropriate to change the threshold to 1, in order to save energy, and such information could be indicated to the user by the indicators.

By making use of the timer 11, the control unit 14 can further be adapted to postpone the turning off of the heating system 21 of the beverage machine 20, even in a case where it determines that the active data register 12a to 12x holds a value equal to lower than a threshold value. The postponing could be for example done based on a usage pattern stored in the memory 15, which for example indicates a usage probability higher than a predetermined threshold probability, even if the value in the active data register 12a to 12x indicates something else. It has to be noted that, for example, in a scenario where four values from 0 to 3 are chosen to be the values which can be held by the data register 12a to 12x, it takes three successive times a beverage machine 20 is not used in a predetermined range of time, to decrease the value to 0 (the exemplary threshold value). However, a usage user pattern of detection results recorded longer than three predetermined ranges of time associated with the respective data register 12a to 12x indicates that in average the probability is quite high that the beverage machine 20 is used. This could happen by coincidence and if for example the predetermined ranges of time are selected to long. Then, it could be the case that shortly after turning off the heating system 21 of the beverage machine 20 a user desires to prepare a beverage. In this case it is beneficial to smartly postpone the turning off of the heating system 21 by a predetermined time period, and therewith further improve the heating energy saving system.

Especially on the border of two adjacent predetermined ranges of time, unwanted effects can happen. Therefore, the control unit 14 could be further adapted to postpone turning off the heating system 21 of the beverage machine 20, even if it determines that the active data register 12a to 12x holds a value equal to or lower than the threshold value, if a temporal distance between the last detected usage of the beverage machine 20 and the beginning of the next predetermined range of time is very short (is below a predetermined threshold time). For example, in a case where several users as a group are preparing hot beverages, it would unfortunate if simply because a predetermined range of time changes to the next predetermined range of time, which is associated with data register 12a to 12x holding a value equal or lower than the threshold value, the heating system 21 is turned off. An immediate usage of the beverage machine 20 before the change of the predetermined range of time indicates a high probability that another usage might occur shortly after. Therefore, postponing by a predetermined time period could be beneficial in such a case.

Figure 5:
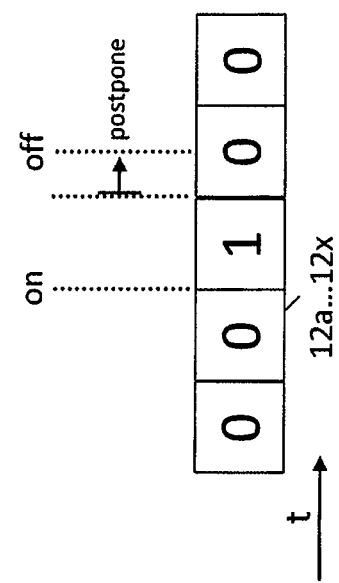
FIG. 5 shows a schematic diagram of the data registers of the heating-energy saving system according to the second embodiment of the present invention.

FIG. 5 shows how a command to turn off or turn on the heating system 21 of the beverage machine 20 can be postponed. For example, when the predetermined time range, which corresponds to the data register 12a to 12x holding the value of 1 in FIG. 5, changes to the next predetermined time range, which corresponds to a data register 12a to 12x holding a value of 0, the issuing of the command is postponed by a predetermined time period. This postponing is indicated by the two shifted dotted vertical lines and the solid arrow.

To make all the above settings most comprehensible to users, it is beneficial to use 24 data registers 12a to 12x, wherein each data register is associated with a predetermined range of time, which measures exactly one hour, so that each data register 12a to 12x corresponds to one hour of the 24 hours of a day.

Figure 6:
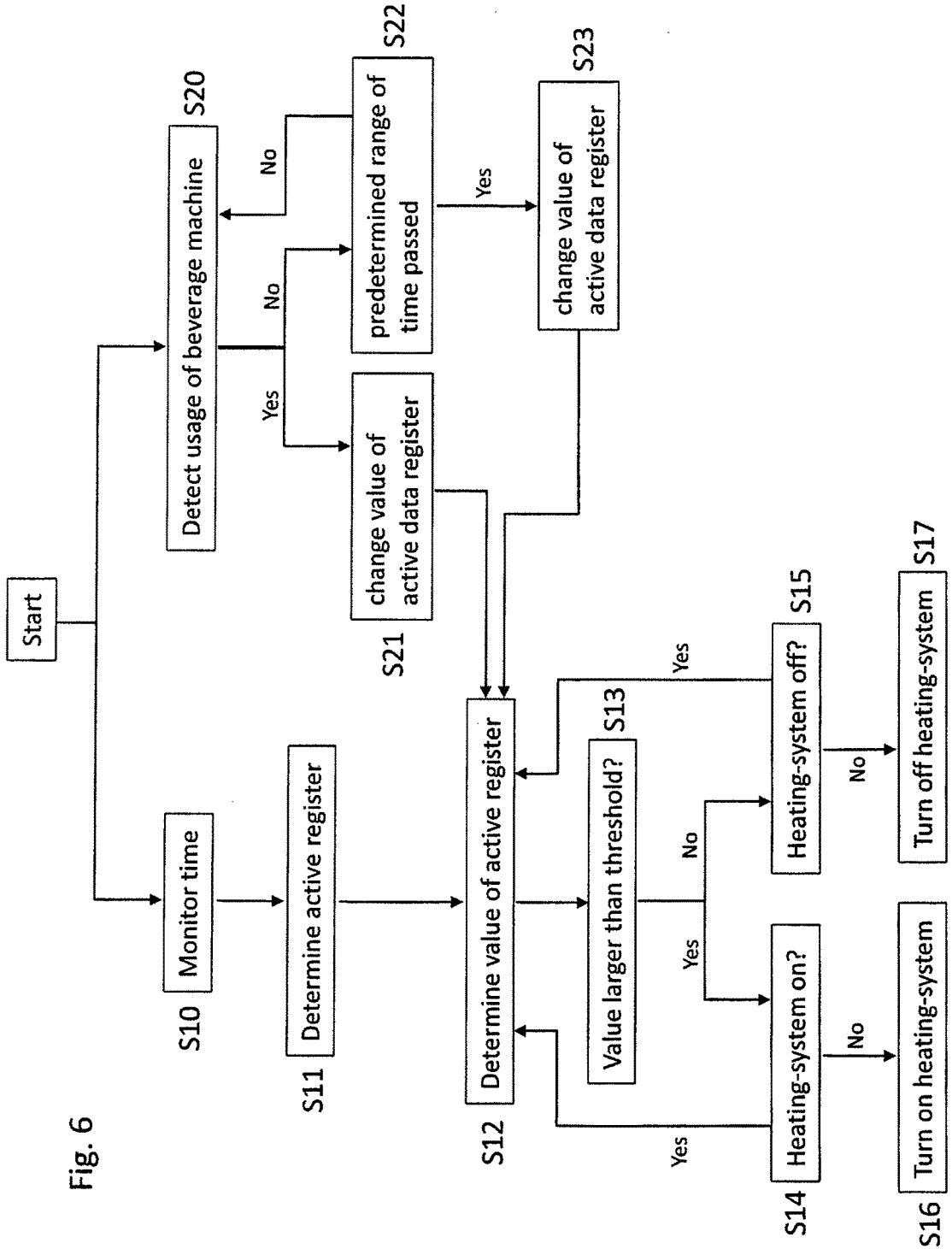
FIG. 6 shows a block diagram of a heating-energy saving method according to the present invention.

FIG. 6 illustrates a heating-energy saving method for use with a heating-system 21 of a beverage machine 20 according to the present invention. The method is constantly monitoring the time in step S10, and is in parallel constantly detecting for a usage of the beverage machine 20 in step S20. Depending on the monitored time the method is able to determine in step S11 the active data register 12a to 12x. Each of the plurality of data registers 12a to 12x is associated with one predetermined range of time, which is determined by monitoring the time and by dividing the total run time into predetermined ranges of time, which are consecutive and are repeated after the total run time has elapsed. After the active data register 12a to 12x has been determined in step S11, the method determines in step S12 the value of the active register 12a to 12x, e.g. by reading it out of the data register. Then the method compares in step S13 the determined (read out) value with a threshold value. The method in particular determines in step S13, whether the determined value is larger than the threshold value or not. In case that the value read out from the active data register 12a to 12x is larger than the threshold value, the method determines in step S14, whether the heating system 21 is turned on. If determined in step S14 that the heating system 21 is turned on, no action occurs and the method returns back to the step S12 of determining the value of the active register 12a to 12x. If the heating system is turned off, the method turns on the heating system 21 in step S16. If on the other hand side, it is determined in step S13 that the value read out from the active register 12a to 12x is not larger than the threshold value, the method determines in step S15, whether the heating-system 21 is turned off. If yes, the method returns to the step S13 of determining the value of the active registers 12a to 12x, without any action. If the heating-system 21 is not turned off, the method turns off the heating system 21 in step S17.

In parallel, as indicated on the right side of the block diagram shown in FIG. 6, the method can distinguish in step S20 between yes and no, concerning the question, whether a usage of the beverage machine 20 was detected. If a usage is detected in step S20, the method changes in step S21 the value of the active data register 12a to 12x, if the value has not already reached a value where no further change is possible. If no detection of the usage of the beverage machine 20 is detected in step S20, the method determines in step S22 whether a predetermined range of time has passed. If a predetermined range of time has passed, the method changes the value of the active data registers 12a to 12x in step S23, except for the case that no further change is possible. After a change of the value of the active data register 12a to 12x has been carried out in step S23, the method proceeds with a new determination of the value in step S12, as indicated by the arrows connecting the right side and the left side of the block diagram. If the method determines in step S22 that no predetermined range of time has passed, the method returns to the step S20, where it again detects for usage of the beverage machine 20.

Further steps, which reflect the functions of the additional features of the heating-energy saving system described above, can be implemented into above described method.

In summary, a heating-energy saving system 10 and a heating-energy saving method are provided, which realize self-learning energy preservation (SLEP) system or method. By means of this system 10 or method, the energy consumption of a beverage machine 20, which is mainly due to heating of the liquid required to provide hot beverages, can be reduced. At the same time, by adaptively learning and anticipating when a user is likely to use the beverage machine 20, the waiting time for the user, which is typically caused by the reheating process of the liquid in the beverage machine 20, can be significantly reduced. The system adapts the heating to what it learns from the user behavior. The described system and method are adapted to be installed in all kinds of beverage machines 20, either used in private or in public.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A heating-energy saving system for use with a heating-system of a beverage machine, the heating-energy saving system comprising:
   a timer;
   a plurality of data registers, each data register is active within a predetermined range of time, wherein each of the plurality of data registers is adapted to hold at least one integer value from 0 to 3, and wherein the integer value is not limited to 0 or 1;
   a detection unit for detecting a usage of the beverage machine;
   a memory for storing detection results of the detection unit; and
   a control unit adapted to (i) determine the values of the plurality of data registers, (ii) increase the value of the active data register by one increment upon a detection of usage of the beverage machine by the detection unit during the predetermined range of time, and decrease the value of the active data register by one increment if no usage of the beverage machine is detected by the detection unit for the predetermined range of time, wherein increased values for the active data register indicate an increased probability of usage in the predetermined range of time, (iii) turn off the heating-system of the beverage machine, if it determines that the at least one integer value of the active data register is equal to 0, (iv) turn on the heating-system of the beverage machine, if it determines that the at least one integer value of the active data register is greater than 0, (v) generate, update and store in the memory patterns regarding the usage of the beverage machine based on the detection results stored in the memory, and to change the predetermined range of time in which a data register is active based on the usage patterns, and (vi) delay turning off the heating system of the beverage machine, even if it determines that the active data register holds a value equal to 0, if a usage pattern stored in the memory indicates a current usage probability greater than a predetermined threshold probability.

2. The heating-energy saving system of claim 1, wherein the control unit is adapted to turn on the heating-system of the beverage machine, if the value of the active data register is determined not to be 0.

3. The heating-energy saving system of claim 1, wherein the detection unit is a flow measurement unit for detecting the output of a beverage.

4. The heating-energy saving system of claim 1, wherein the detection unit is a motion detector and the control unit is adapted to turn on the heating-system of the beverage machine, if it detects motion for a predetermined period of time.

5. The heating-energy saving system of claim 1, wherein the detection unit is adapted to detect the input of coins or the insertion of a credit card into the beverage machine.

6. The heating-energy saving system of claim 1, comprising:
   a touch panel for receiving a user input; and
   the control unit is adapted to change the predetermined range of time, in which a data register is active, based on the user input.

7. The heating-energy saving system of claim 1, wherein the control unit is adapted to delay turning off the heating-system of the beverage machine, even if it determines that the active data register holds a value equal to 0, if a temporal distance between the last detected usage of the beverage machine and a beginning of a predetermined range of time, in which a next data register becomes active, is below a predetermined threshold time.

8. The heating-energy saving system of claim 1, comprising 24 data registers, wherein the predetermined range of time, in which each data register is active, is one hour measured by the timer.

9. A method for using a heating-system of a beverage machine, the method comprising:
   monitoring a time;
   associating each of a plurality of data registers with a predetermined range of time, wherein an active data register is associated with the current predetermined range of time, wherein each of the plurality of data registers is adapted to hold at least one integer value from 0 to 3, and wherein the integer value is not limited to 0 or 1;
   detecting a usage of the beverage machine;
   determining, using a control unit, the value of the active data register, increasing the value of the active data register by one increment upon a detection of usage of the beverage machine during the predetermined range of time in the detecting step, and decreasing the value of the active data register by one increment if no usage of the beverage machine is detected for the predetermined range of time in the detecting step, wherein increased values for the active data register indicate an increased probability of usage in the predetermined range of time;
   turning off the heating-system of the beverage machine, if the control unit determines that the at least one integer value of the active data register is equal to 0, and turning on the heating-system of the beverage machine, if the control unit determines that the at least one integer value of the active data register is greater than 0;
   using the control unit to generate, update and store in a memory patterns regarding the usage of the beverage machine based on the detection, and to change the predetermined range of time in which a data register is active based on the usage patterns; and
   using the control unit to delay turning off the heating system of the beverage machine, even if it determines that the active data register holds a value equal to 0, if a usage pattern stored in the memory indicates a current usage probability greater than a predetermined threshold probability.

10. A computer program implemented on a computer for the following steps in a method for use with a heating-system of a beverage machine, the method comprising:
    monitoring a time;
    associating each of a plurality of data registers with a predetermined range of time, wherein an active data register is associated with the current predetermined range of time, wherein each of the plurality of data registers is adapted to hold at least one integer value from 0 to 3, and wherein the integer value is not limited to 0 or 1;
    detecting a usage of the beverage machine;
    determining, using a control unit of the computer, the value of the active data register, increasing the value of the active data register by one increment upon a detection of usage of the beverage machine during the predetermined range of time in the detecting step, and decreasing the value of the active data register by one increment if no usage of the beverage machine is detected for the predetermined range of time in the detecting step, wherein increased values for the active data register indicate an increased probability of usage in the predetermined range of time;

turning off the heating-system of the beverage machine, if the control unit determines that the at least one integer value of the active data register is equal to 0, and turning on the heating-system of the beverage machine, if the control unit determines that the at least one integer value of the active data register is greater than 0;

using the control unit to generate, update and store in a memory patterns regarding the usage of the beverage machine based on the detection, and to change the predetermined range of time in which a data register is active based on the usage patterns; and using the control unit to delay turning off the heating system of the beverage machine, even if it determines that the active data register holds a value equal to 0, if a usage pattern stored in the memory indicates a current usage probability greater than a predetermined threshold probability.

* * * * *